United States Patent
Schlag et al.

(10) Patent No.: US 8,735,022 B2
(45) Date of Patent: May 27, 2014

(54) FUEL CELL COMPONENT WITH COATING INCLUDING NANOPARTICLES

(75) Inventors: Harald Schlag, Ruesselsheim (DE); Ralf Senner, Pittsford, NY (US); Thomas A. Trabold, Pittsford, NY (US); Thomas W. Tighe, Bloomfield, NY (US); Gayatri Vyas, Rochester Hills, MI (US); Keith E. Newman, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1178 days.

(21) Appl. No.: 11/463,338

(22) Filed: Aug. 9, 2006

(65) Prior Publication Data

US 2014/0093639 A1  Apr. 3, 2014

Related U.S. Application Data

(60) Provisional application No. 60/707,705, filed on Aug. 12, 2005.

(51) Int. Cl.
  *H01M 4/64*  (2006.01)
  *H01M 8/02*  (2006.01)

(52) U.S. Cl.
  CPC .......... *H01M 8/0245* (2013.01); *H01M 8/0228* (2013.01); *H01M 8/0202* (2013.01); *H01M 8/0258* (2013.01); *Y02E 60/50* (2013.01)
  USPC ........... 429/518; 429/421; 429/458; 429/457; 429/461; 429/514; 429/517; 429/519; 429/520; 429/532; 429/535

(58) Field of Classification Search
  CPC .. Y02E 60/50; H01M 8/0258; H01M 8/0228; H01M 8/0202; H01M 8/0245
  USPC ......... 429/421, 457, 458, 461, 514, 512, 517, 429/518, 519, 520, 522, 532, 535
  See application file for complete search history.

(56) References Cited

U.S. PATENT DOCUMENTS

| | | | |
|---|---|---|---|
| 4,121,946 A * | 10/1978 | Chuiko et al. | 106/481 |
| 4,175,165 A | 11/1979 | Adlhart | |
| 2002/0040742 A1 | 4/2002 | Kojima et al. | |
| 2003/0064265 A1* | 4/2003 | Hampden-Smith et al. | 429/30 |
| 2004/0038808 A1* | 2/2004 | Hampden-Smith et al. | 502/180 |
| 2004/0081880 A1 | 4/2004 | Chang | |
| 2005/0100771 A1* | 5/2005 | Vyas et al. | 429/32 |

FOREIGN PATENT DOCUMENTS

| | | | |
|---|---|---|---|
| JP | 2001093539 A | 4/2001 | |
| JP | 2001307751 A | 11/2001 | |
| JP | 2002030462 A | 1/2002 | |
| JP | 2002060692 A | 2/2002 | |

(Continued)

OTHER PUBLICATIONS

Japanese Office Action JP 2008-526128; Mailed Aug. 17, 2011; 4 pages.

*Primary Examiner* — Patrick Ryan
*Assistant Examiner* — Ben Lewis
(74) *Attorney, Agent, or Firm* — BrooksGroup (57) ABSTRACT

A product comprising a fuel cell component comprising a substrate and a coating overlying the substrate, the coating comprising nanoparticles having sizes ranging from 2 to 100 nanometers.

24 Claims, 9 Drawing Sheets (56) References Cited

FOREIGN PATENT DOCUMENTS

| JP | 2004031166 A | 1/2004 |
| JP | 2005089705 A | 4/2005 |
| WO | 2004087339 A1 | 10/2004 |

* cited by examiner

FUEL CELL COMPONENT WITH COATING INCLUDING NANOPARTICLES

CROSS-REFERENCE TO RELATED APPLICATIONS

This application claims the benefit of U.S. Provisional Application No. 60/707,705, filed Aug. 12, 2005.

FIELD

The disclosure generally relates to fuel cell components with a coating including nanoparticles thereon.

BACKGROUND

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electro-chemical device that includes an anode and a cathode with an electrolyte therebetween. The anode receives hydrogen-rich gas or pure hydrogen and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work may be used to operate a vehicle, for example.

Proton exchange membrane fuel cells (PEMFC) are popular for vehicle applications. The PEMFC generally includes a solid-polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation. These conditions include proper water management and humidification, and control of catalyst poisoning constituents, such as carbon monoxide (CO).

Several fuel cells are typically combined in a fuel cell stack to generate the desired power. For the automotive fuel cell stack mentioned above, the stack may include about two hundred or more bipolar plates. The fuel cell stack receives a cathode reactant gas, typically a flow of air forced through the stack by a compressor. Not all of the oxygen is consumed by the stack and some of the air is output as a cathode exhaust gas that may include liquid water as a stack by-product. The fuel cell stack also receives an anode hydrogen reactant gas that flows into the anode side of the stack.

The fuel cell stack includes a series of flow field or bipolar plates positioned between the several MEAs in the stack. The bipolar plates include an anode side and a cathode side for adjacent fuel cells in the stack. Anode gas flow channels are provided on the anode side of the bipolar plates that allow the anode gas to flow to the anode side of the MEA. Cathode gas flow channels are provided on the cathode side of the bipolar plates that allow the cathode gas to flow to the cathode side of the MEA. The bipolar plates may also include flow channels for a cooling fluid.

The bipolar plates are typically made of a conductive material, such as stainless steel, titanium, aluminum, polymeric carbon composites, etc., so that they conduct the electricity generated by the fuel cells from one cell to the next cell and out of the stack. Metal bipolar plates typically produce a natural oxide on their outer surface that makes them resistant to corrosion. However, this oxide layer is not conductive, and thus increases the internal resistance of the fuel cell, reducing its electrical performance. Also, the oxide layer frequently makes the plates more hydrophobic.

US Patent Application Publication No. 2003/0228512, assigned to the assignee of this application, and the disclosure of which is herein incorporated by reference, discloses a process for depositing a conductive outer layer on a flow field plate that prevents the plate from oxidizing and increasing its ohmic contact. U.S. Pat. No. 6,372,376, also assigned to the assignee of this application, discloses depositing an electrically conductive, oxidation resistant and acid resistant coating on a flow field plate. US Patent Application Publication No. 2004/0091768, also assigned to the assignee of this application, discloses depositing a graphite and carbon black coating on a flow field plate for making the flow field plate corrosion resistant, electrically conductive and thermally conductive.

As is well understood in the art, the membranes within a fuel cell need to have a certain relative humidity so that the ionic resistance across the membrane is low enough to effectively conduct protons. During operation of the fuel cell, moisture from the MEAs and external humidification may enter the anode and cathode flow channels. At low cell power demands, typically below 0.2 A/cm$^2$, water accumulates within the flow channels because the flow rate of the reactant gas is too low to force the water out of the channels. As the water accumulates, it forms droplets that continue to expand because of the hydrophobic nature of the plate material. The contact angle of the water droplets is generally about 90° in that the droplets form in the flow channels substantially perpendicular to the flow direction of the reactant gas. As the size of the droplets increases, the flow channel is closed off, and the reactant gas is diverted to other flow channels because the channels flow in parallel between common inlet and outlet manifolds. Because the reactant gas may not flow through a channel that is blocked with water, the reactant gas cannot force the water out of the channel. Those areas of the membrane that do not receive reactant gas as a result of the channel being blocked will not generate electricity, thus resulting in a non-homogenous current distribution and reducing the overall efficiency of the fuel cell. As more and more flow channels are blocked by water, the electricity produced by the fuel cell decreases, where a cell voltage potential less than 200 mV is considered a cell failure. Because the fuel cells are electrically coupled in series, if one of the fuel cells stops performing, the entire fuel cell stack may stop performing.

It is usually possible to purge the accumulated water in the flow channels by periodically forcing the reactant gas through the flow channels at a higher flow rate. However, on the cathode side, this increases the parasitic power applied to the air compressor, thereby reducing overall system efficiency. Moreover, there are many reasons not to use the hydrogen fuel as a purge gas, including reduced economy, reduced system efficiency and increased system complexity for treating elevated concentrations of hydrogen in the exhaust gas stream.

Reducing accumulated water in the channels can also be accomplished by reducing inlet humidification. However, it is desirable to provide some relative humidity in the anode and cathode reactant gases so that the membrane in the fuel cells remains hydrated. A dry inlet gas has a drying effect on the membrane that could increase the cell's ionic resistance, and limit the membrane's long-term durability.

It has been proposed by the present inventors to make bipolar plates for a fuel cell hydrophilic to improve channel water transport. A hydrophilic plate causes water in the channels to spread along the surface in a process termed spontaneous wetting. The resulting thin film has less of a tendency to alter the flow distribution along the array of channels connected to the common inlet and outlet headers. If the plate material has sufficiently high surface energy, water transport through the diffusion media will contact the channel walls and then, by capillary force, be transported into the bottom corners of the channel along its length. The physical requirements to support spontaneous wetting in the corners of a flow channel are described by the Concus-Finn condition, $$\beta + \frac{\alpha}{2} < 90°,$$

where $\beta$ is the static contact angle formed between a liquid surface and solid surface, and $\alpha$ is the channel corner angle. For a rectangular channel $\alpha/2=45°$, which dictates that spontaneous wetting will occur when the static contact angle is less than 45°. For the roughly rectangular channels used in current fuel cell stack designs with composite bipolar plates, this sets an approximate upper limit on the contact angle needed to realize the beneficial effects of hydrophilic plate surfaces on channel water transport and low load stability.

SUMMARY OF EXEMPLARY EMBODIMENTS OF THE INVENTION

One embodiment of the invention includes a product comprising a fuel cell component comprising a substrate and a coating overlying the substrate, the coating comprising nanoparticles having sizes ranging from 2 to 100 nm.

Other embodiments of the present invention will become apparent from the detailed description provided hereinafter. It should be understood that the detailed description and specific examples, while indicating embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF PREFERRED EMBODIMENTS

The following description of the preferred embodiment(s) is merely exemplary in nature and is in no way intended to limit the invention, its application, or uses.

One embodiment of the invention includes a fuel cell component having a substrate, such as, but not limited to, a bipolar plate having a coating including nanoparticles. The nanoparticles may have sizes ranging from about 2 to about 100 nm; preferably, about 2 to about 20 nm; and most preferably about 2 to about 5 nm. The nanoparticles may include inorganic and/or organic materials. The coating may also include a compound including hydroxyl, halide, carboxyl, ketonic and/or aldehyde functional groups. The coating makes the fuel cell component, such as a bipolar plate, hydrophilic.

One embodiment of the invention includes a fuel cell component having a hydrophilic coating comprising nanoparticles having hydrophilic side chains.

One embodiment of the invention includes a fuel cell component having a hydrophilic coating comprising nanoparticles comprising 10 to 90 weight percent inorganic structures, 5 to 70 weigh percent hydrophilic side chains, and 0 to 50 weight percent organic side chains having functional groups. Such a combination of materials provides hydrophilization of surfaces, wherein the coating consists of nanoscale particles having hydrophilic side chains, which can be sintered.

In one embodiment of the invention the hydrophilic side chains are amino, sulfonate, sulfate, sulfite, sulfonamide, sulfoxide, carboxylate, polyol, polyether, phosphate, or phosphonate groups.

In one embodiment of the invention the coating may include organic side chains and wherein the functional groups of the organic side chains are epoxy, acryloxy, methacryloxy, glycidyloxy, allyl, vinyl, carboxyl, mercapto, hydroxyl, amide or amino, isocyano, hydroxy, or silanol groups. In one embodiment of the invention the coating has pH ranging from 3 to 10.

Another embodiment of the invention includes depositing a slurry solution on a fuel cell component. The slurry solution includes nanoparticles and a vehicle, and thereafter driving off the vehicle. The vehicle may include water, alcohol, other suitable solvents, or combinations thereof. In one embodiment the slurry includes 4-5 weight percent nanoparticles with the remaining portion being the vehicle. In one embodiment the vehicle may be driven off at a temperature ranging from about 80 to about 180° C. The curing period may range from 10 minutes at 80° C. to 10 seconds at 180° C.

Another means of applying nanoparticles to render a surface hydrophilic is the sol-gel process which involves the transition of a system from a colloidal state into a solid gel. The colloid is made of solid nanoparticles suspended in a liquid phase. In a typical sol-gel process, the colloidal suspension is first formulated, from which the nanoparticles particles condense in a new phase, the gel, in which a solid macromolecule is immersed in a solvent. Through subsequent drying and curing, according to the same temperature ranges stated above, the final material constitutes a relatively continuous hydrophilic coating.

Suitable slurry materials are available from Nano-X GmbH under the tradenames HP 3408 and HP 4014. The slurry materials provide hydrophilic coatings capable of surviving fuel cell operating condition for more than 2500 hours. The coating may be formed on metals, such as aluminum and high-grade stainless steel, polymeric substrates, and electrically conductive composite substrates, such as bipolar plates.

US patent application number 2004/0237833, the disclosure of which is hereby incorporated by reference, describes a number of ways to make a slurry useful in the present invention which are duplicated hereafter.

Example 1

221.29 g (1 mol) 3-aminopropyl triethoxy silane are added to 444.57 g sulfosuccinic acid, while stirring, and heated to 120° C. in a silicone bath for 5 h. After the reaction mixture has cooled, 20 g of the viscous fluid are mixed with 80 g (0.38 mol) tetraethoxy silane, and absorbed in 100 g ethyl alcohol. The solution is then mixed with 13.68 g (0.76 mol) of a 0.1 N HCl solution, and tempered in a water bath overnight, at 40° C. This results in hydrophilic nanoparticles having reactive end groups of approximately 2 nm. The resulting solution is diluted with a mixture of 1/3 water and 2/3 N-methyl pyrrolidone (NMP), to a solid substance content of 5%, and applied to a glass plate by spraying, in a wet film thickness of 10 to 20 .μm. Subsequently, the substrate is compacted in a circulating air drying cabinet for 3 h, at 150° C.

Example 2

221.29 g (1 mol) 3-aminopropyl triethoxy silane are added to 444.57 g sulfosuccinic acid, while stirring. Then the solution is heated to 130° C. in a silicone bath. After a reaction time of 1 h, 332.93 g of an alkaline-stabilized aqueous silica gel solution of the Levasil 300/30% type (pH=10) are added to the reaction solution, while stirring. After a reaction time of 12 h, the mixture is diluted with water, to a solid substance content of 5%. This results in hydrophilic nanoparticles having reactive end groups of approximately 15 nm. The system is applied to plasma-activated polycarbonate sheets by means of inundation, and subsequently dried in a circulating air drying cabinet for 5 h, at 130° C.

Example 3

123.68 g (0.5 mol) 3-isocyanatopropyl triethoxy silane are added to 600 g (1 mol) polyethylene glycol 600, and heated to 130° C. in a silicone bath, after adding 0.12 g dibutyl tin laurate (0.1 wt.-% with regard to 3-isocyanatopropyl triethoxy silane). 25 g (0.12 mol) tetraethoxy silane and 33.4 g (0.12 mol) 3-glycidyloxy propyl triethoxy silane are added to 50 g of the resulting solution (solution A), while stirring. After adding 15.12 g (0.84 mol) of a 0.1 N HCl solution, the mixture is hydrolyzed and condensed at room temperature for 24 h. This results in hydrophilic nanoparticles having reactive end groups of approximately 5 nm.

Example 4

12.5 g (0.05 mol) 3-methacryloxy propyl trimethyloxy silane, 12.5 g of a 20% aqueous $CeO_2$ solution (from Aldrich), and 50 g ethyl alcohol are added to 50 g of the solution A described in Exemplary Embodiment 3, while stirring, in order to homogenize the mixture, and hydrophilization takes place for 48 h. After adding 0.375 g Ingacure 184 from Ciba Spezialitaten Chemie (3 wt.-% with reference to 3-methacryloxy propyl trimethoxy silane), the mixture is applied to a flamed polycarbonate sheet by means of spraying, in a wet film thickness of at most 30 μm, and first dried thermally in a circulating air drying cabinet at 130° C. for 10 min. This is followed by photochemical drying with Hg emitters having a radiation output of 1-2 $J/cm^2$.

Figure 1:
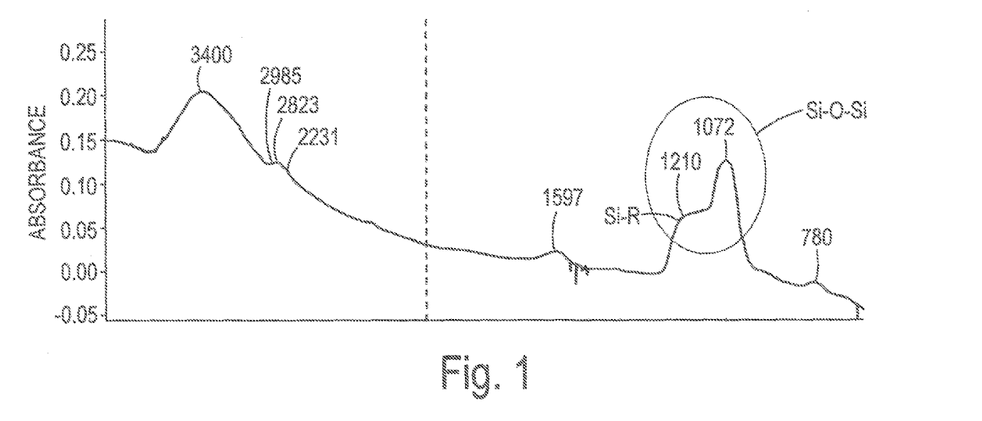
FIG. 1 is a graph of the result of Fourier-transform infrared spectra of a coating produced according to one embodiment of the invention.
Figure 2:
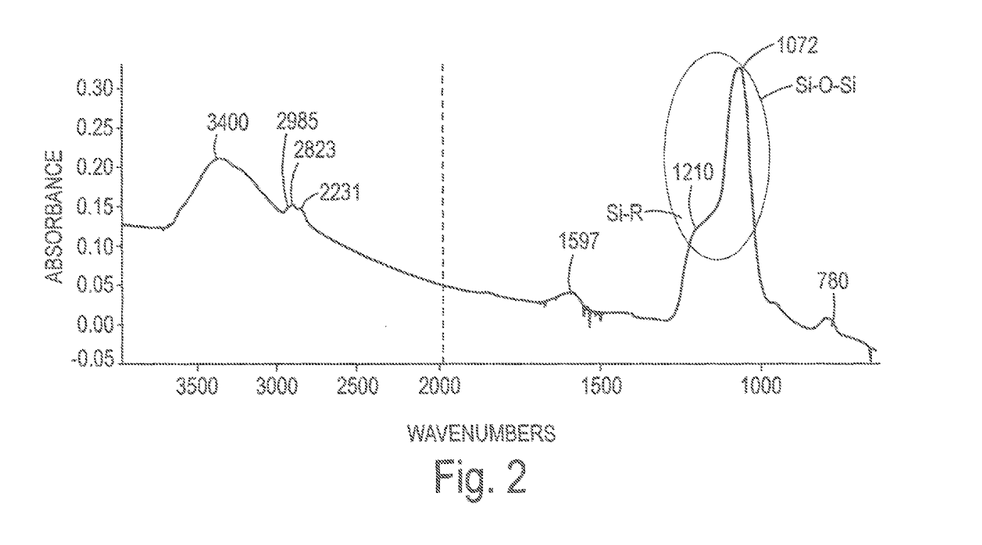
FIG. 2 is a graph of the result of Fourier-transform infrared spectra of a coating produced according to another embodiment of the invention.

The Fourier-transform infrared (FTIR) spectra illustrated in FIGS. 1 and 2 are for two different coatings including nanoparticles according to one embodiment of the invention. In both FIG. 1 and FIG. 2, a small "shoulder" peak appears on the left side of the main Si—O—Si peak, representing a relatively low Si—R content where R is a saturated or unsaturated carbon chain including at least one carbon atom.

Figure 3:
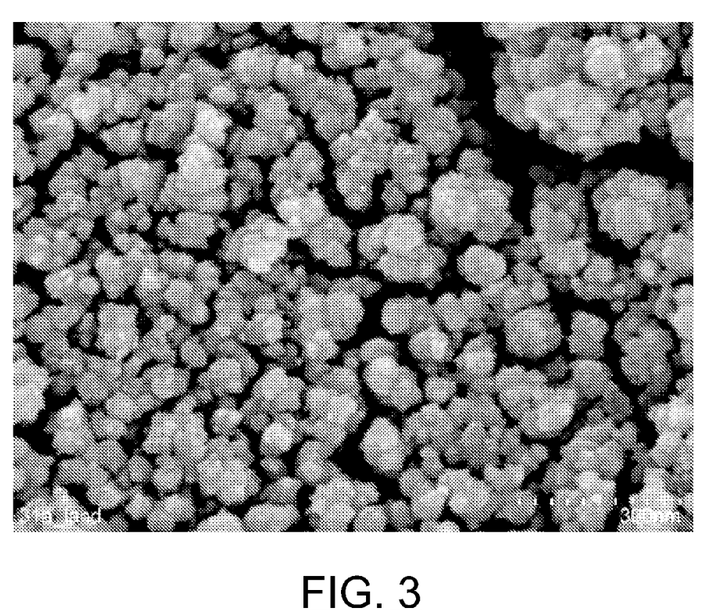
FIG. 3 is a photo micrograph of a coating according to one embodiment of the invention.

A scanning electron micrograph of the preferred coating is illustrated in FIG. 3. The coating is porous and the nanoparticles have a nodule shape.

The scope of the invention is not limited to the above describe materials and methods of making the same, but includes other coatings including nanoparticles formed on a fuel cell component. The following is a description of additional embodiments of coatings and methods of making the same.

For example, suitable nanoparticles include but are not limited to $SiO_2$, other metal oxides, such as $HfO_2$, $ZrO_2$, $Al_2O_3$, $SnO_2$, $Ta_2O_3$, $Nb_2O_5$, $MoO_2$, $IrO_2$, $RuO_2$, metastable oxynitrides, nonstoichiometric metal oxides, oxynitrides, and derivatives thereof including carbon chains or including carbon, and mixtures thereof.

In one embodiment the coating is hydrophilic and includes at least one Si—O group, at least one polar group and at least one group including a saturated or unsaturated carbon chain. In one embodiment of the invention the polar group may include a hydroxyl, halide, carboxyl, ketonic or aldehyde functional groups. In one embodiment of the invention the carbon chain may be saturated or unsaturated and may have between 1 and 4 carbon atoms. The coating may have additional elements or compounds, including, for example, Au, Ag, Ru, Rh, Pd, Re, Os, Ir, Pt, rare earth metals, alloys thereof, polymeric carbon or graphite to improve conductivity.

In one embodiment of the invention the coating includes an Si—O group and an Si—R group wherein R includes a saturated or unsaturated carbon chain, and wherein the molar ratio of Si—R groups to Si—O groups ranges from ⅛ to ½, preferably ¼ to ½. In another embodiment of the invention the coating further includes hydroxyl groups to improve the hydrophilicity of the coating.

Another embodiment of the invention includes a fuel cell component having a component with a coating thereon, and wherein the coating is derived from a siloxane. The siloxane may be linear, branched or cyclic. In one embodiment the siloxane has the formula $R_2SiO$, wherein R is an alkyl group.

Another embodiment of the invention includes a fuel cell component having a component with a coating thereon, and wherein the coating is derived from a material having the formula wherein $R_1$, $R_2$, $R_3$, $R_4$, $R_5$, and $R_6$, each may be H, O, Cl, or a saturated or unsaturated carbon chain having 1 to 4 carbon atoms, and wherein $R_1$, $R_2$, $R_3$, $R_4$, $R_5$, and $R_6$, may be the same or different.

Another embodiment of the invention includes a product comprising a fuel cell component having a coating formed thereon and wherein the coating is formed by a process comprising plasma enhanced chemical vapor deposition of the coating from a precursor gas comprising a material having the formula wherein $R_1$, $R_2$, $R_3$, $R_4$, $R_5$, and $R_6$, each may be H, O, Cl, or a saturated or unsaturated carbon chain having 1 to 4 carbon atoms, and wherein $R_1$, $R_2$, $R_3$, $R_4$, $R_5$, and $R_6$, may be the same or different, and further comprising treating the plasma enhanced chemical deposition deposited coating to provide polar groups. In another embodiment of the invention, at least one of $R_1$, $R_2$, $R_3$, $R_4$, $R_5$, or $R_6$ is a carbon chain with at least one carbon atom.

Another embodiment of the invention includes post-treating the deposited coating comprising subjecting the coating to a plasma comprising oxygen to produce polar groups in the deposited coating.

Another embodiment of the invention includes a fuel cell component having a coating thereon, wherein the coating includes nanoparticles having a size ranging from 1 to 100 nm, preferably 1 to 50, and most preferably 1 to 10 nm, and wherein the nanoparticles comprise a compound comprising silicon, a saturated or unsaturated carbon chain and a polar group.

Another embodiment of the invention includes a fuel cell having a bipolar plate with a hydrophilic coating thereon, and a diffusion media positioned adjacent the bipolar plate. The hydrophilic coating includes nodule shaped nanoparticles and the coating is sufficiently porous so that fibers from a diffusion media position adjacent the coating on the bipolar plate extend through the coating to provide an electrical path through the coating from the bipolar plate to the diffusion media.

Hydrophilic coating may also be required on the anode side of the bipolar plates, because anode water accumulation is known to influence operational stability under some conditions, and is suspected to impact electrode and membrane durability through hydrogen starvation. However, it is expected that the rate of coating dissolution on the anode side will be faster than on the cathode side as a result of higher HF concentration in the water produced during fuel cell operation. Therefore, the anode coating should be thicker than the cathode coating to achieve durability to the end of fuel cell life. In one embodiment of the invention, the mean anode coating thickness is approximately 15% greater than the mean cathode coating thickness.

The coating should be thick enough to accommodate the rate of material dissolution in the dilute HF environment within the fuel cell to end-of-life. Conversely, the coating should be thin enough, with the preferred discontinuous morphology, to minimize the added electrical resistance. In one embodiment the coating may have a mean thickness of 80-100 nm.

In one embodiment of the invention, the precursor gas is preferably hexamethyl disiloxane (HMDSO) but can be selected from among inorganic or organic derivatives from siloxanes, silanols or silane based chemistry, or other carbon and/or silicon containing gases and/or liquids. In one embodiment of the invention, the coating process involves microwave plasma-enhanced chemical vapor deposition (CVD) using hexamethyl disiloxane (HMDSO) precursor and pure oxygen as a carrier gas, which results in a siloxane-like (SiOx) coating. The microwave frequency is fixed at 2.45 GHz. The process temperature may be relatively low, in the range of ambient to 45° C., so that any practical bipolar plate material can be coated without concerns of thermal damage or distortion. The actual application of the hydrophilic coating material, and its resulting chemical and physical structure, is controlled by the six adjustable process parameters associated with the coating apparatus, in this case the PLASMAtech Model 110: operated at a pressure ranging from 0 to 500 Pa; preferably: 10 to 100 Pa; and most preferably: 30 Pa.; at a microwave power ranging from 50 W to 10 kW, preferably: 100 W to 1 kW, and most preferably: 200 to 300 W for a CVD reactor with volume of 110 liters. The precursor gas is preferably hexamethyl disiloxane (HMDSO) but can be selected from among inorganic or organic derivatives from siloxanes, silanols or silane based chemistry, or other carbon and/or silicon containing gases and/or liquids as described above. The carrier gas is preferably oxygen, but may include at least one of nitrogen, nitrous oxide, argon, argon-oxygen, or their mixtures, or mixtures with other gases in appropriate ratios.

The ratio of precursor-to-carrier gas volumetric flow rate has a significant effect on the resulting chemical structure and morphology of the coated layer. In general, particularly with a siloxane-containing precursor, a small precursor-to-carrier ratio will result in a denser coating that approaches the chemical structure of pure $SiO_2$. As this ratio is increased, the organic content of the coating increases, which most likely reduces the hydrophilicity (i.e., increases static contact angle)

but also increases the porosity of the coating structure. It is the balance of these characteristics that is critical for application in a fuel cell, to attain the required contact angle, while also minimizing the added electrical resistance. In one embodiment of the invention, the precursor-to-carrier flow ratio is 2 to 16%, preferably: 4 to 12%, and most preferably: 8 to 10%.

The absolute gas flow rates will be functions of the total reactor volume. For the PLASMAtech Model 110 used to produce the bipolar plate coatings described herein, the gas flow ranges (assuming a gas flow ratio of 8 to 10% as discussed above) are as follows: Applicable ranges: Precursor=2-50 ml/min; Carrier=20-625 ml/min, preferably: Precursor=10-30 ml/min; Carrier=100-375 ml/min, and most preferably: Precursor=15-20 ml/min; Carrier=150-250 ml/min.

The reactor time will dictate the thickness of the coated layer, but may also impact the coating morphology. The time may be selected to produce a coating that is thick enough to accommodate the rate of material dissolution in the dilute HF environment within the fuel cell to end-of-life. Conversely, the coating should be thin enough, with the preferred discontinuous morphology, to minimize the added electrical resistance. This combination of coating characteristics was optimized by using a reactor time of 4 minutes per side of the bipolar plates, to produce a coating with mean thickness of 80-100 nm.

A post-treatment process may be required to introduce polar functional moieties (predominantly hydroxyl groups) onto the base $SiO_x$ structure, thereby further enhancing the material hydrophilicity. In one embodiment of the invention, this is done by exposing the $SiO_x$ films to a reactive oxygen plasma which would activate the $SiO_x$ coating by breaking organic bonds and forming hydroxyl, carboxyl and aldehyde functional groups. This activation by post-treatment also enhances the material porosity, which may further reduce the electrical resistance. In another embodiment, the coating is reacted with a chemical to produce the polar groups. In another embodiment, the polar groups are introduced by applying a thin layer of a hydrophilic coating.

In one embodiment of the invention, the post-treatment process involves exposure to a microwave-generated oxygen plasma environment for 0 to 5 minutes, preferably: 0.5 to 3 minutes, and most preferably: 1.5 minutes.

Figure 4:
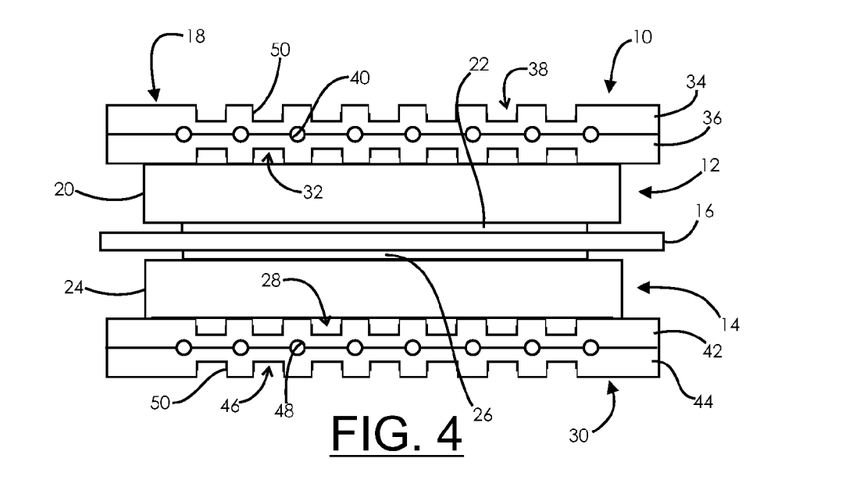
FIG. 4 is a cross-sectional view of a fuel cell in a portion of a fuel cell stack that includes bipolar plates having a coating to make the plate hydrophilic, according to one embodiment of the invention.

FIG. 4 is a cross-sectional view of a fuel cell 10 that is part of a fuel stack of the type discussed above. The fuel cell 10 includes a cathode side 12 and an anode side 14 separated by an electrolyte membrane 16. A cathode side diffusion media layer 20 is provided on the cathode side 12, and a cathode side catalyst layer 22 is provided between the membrane 16 and the diffusion media layer 20. Likewise, an anode side diffusion media layer 24 is provided on the anode side 14, and an anode side catalyst layer 26 is provided between the membrane 16 and the diffusion media layer 24. The catalyst layers 22 and 26 and the membrane 16 define an MEA. The diffusion media layers 20 and 24 are porous layers that provide for input gas transport to and water transport from the MEA. Various techniques are known in the art for depositing the catalyst layers 22 and 26 on the diffusion media layers 20 and 24, respectively, or on the membrane 16.

A cathode side flow field plate or bipolar plate 18 is provided on the cathode side 12 and an anode side flow field plate or bipolar plate 30 is provided on the anode side 14. The bipolar plates 18 and 30 are provided between the fuel cells in the fuel cell stack. A hydrogen reactant gas flow from flow channels 28 in the bipolar plate 30 reacts with the catalyst layer 26 to dissociate the hydrogen ions and the electrons. Airflow from flow channels 32 in the bipolar plate 18 reacts with the catalyst layer 22. The hydrogen ions are able to propagate through the membrane 16 where they electrochemically react with the oxygen in the airflow and the electrons in the catalyst layer 22 to generate water as a by-product.

In this non-limiting embodiment, the bipolar plate 18 may include two sheets 34 and 36 that are stamped and welded together. The sheet 36 defines the flow channels 32 and the sheet 34 defines flow channels 38 for the anode side of an adjacent fuel cell to the fuel cell 10. Cooling fluid flow channels 40 are provided between the sheets 34 and 36, as shown. Likewise, the bipolar plate 30 includes a sheet 42 defining the flow channels 28, a sheet 44 defining flow channels 46 for the cathode side of an adjacent fuel cell, and cooling fluid flow channels 48. In the embodiments discussed herein, the sheets 34, 36, 42 and 44 are made of an electrically conductive material, such as stainless steel, titanium, aluminum, polymeric carbon composites, etc.

According to one embodiment of the invention, the bipolar plates 18 and 30 include a coating 50 that makes the plates 18 and 30 hydrophilic. The hydrophilicity of the coating 50 causes the water within the flow channels 28 and 32 to form a film instead of water droplets so that the water does not significantly block the flow channels. Particularly, the hydrophilicity of the coating 50 decreases the contact angle of water accumulating within the flow channels 32, 38, 28 and 46, preferably below 40°, so that the reactant gas is still able to flow through the channels 28 and 32 at low loads. In one embodiment, the coating 50 is a thin film, for example, in the range of 5 to 50 nm, so that the conductivity of the sheets 34, 36, 42 and 44 still allows electricity to be effectively coupled out of the fuel cell 10.

According to another embodiment of the present invention, the coating 50 is combined with a conductive material, such as Au, Ag, Ru, Rh, Pd, Re, Os, Ir, Pt, rare earth metals, alloys thereof, polymeric carbon or graphite, that increases the conductivity of the coating 50. By making the bipolar plates 18 and 30 more conductive, the electrical contact resistance and the ohmic losses in the fuel cell 10 are reduced, thus increasing cell efficiency. Also, a reduction in compression force in the stack can be provided, addressing certain durability issues within the stack.

Before the coating 50 is deposited on the bipolar plates 18 and 30, the bipolar plates 18 and 30 may be cleaned by a suitable process, such as ion beam sputtering, to remove the resistive oxide film on the outside of the plates 18 and 30 that may have formed. The coating can be deposited on the bipolar plates 18 and 30 by any suitable technique including, but not limited to, physical vapor deposition processes, chemical vapor deposition (CVD) processes, thermal spraying processes, sol-gel, spraying, dipping, brushing, spinning on, or screen printing. Suitable examples of physical vapor deposition processes include electron beam evaporation, magnetron sputtering and pulsed plasma processes. Suitable chemical vapor deposition processes include plasma enhanced CVD and atomic layer deposition processes. CVD deposition processes may be more suitable for the thin film layers of the coating 50.

Figure 5:
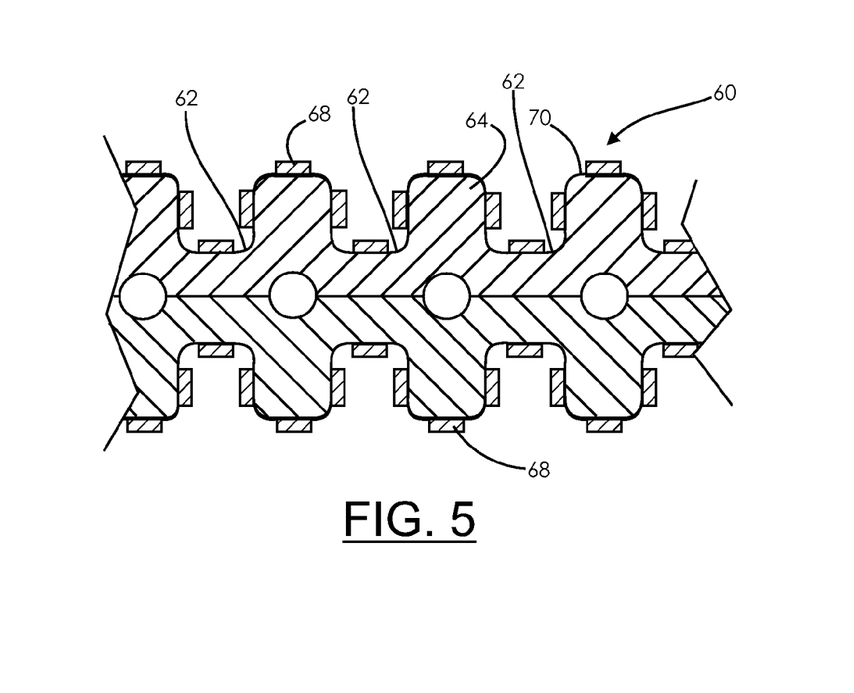
FIG. 5 is a broken-away, cross-sectional view of a bipolar plate for a fuel cell including a coating defined by islands separated by open areas, according to another embodiment of the invention.

FIG. 5 is a broken-away, cross-sectional view of a bipolar plate 60 including reactant gas flow channels 62 and lands 64 therebetween, according to another embodiment of the invention. The bipolar plate 60 is applicable to replace the bipolar plate 18 or 30 in the fuel cell 10. In this embodiment, a coating 50 is deposited as random islands 68 on the plate 60 so that the conductive material of plate 60 is exposed at areas 70 between the islands 68. The coating islands 68 provide the desired hydrophilicity of the plate 60, and the exposed areas 70 provide the desired conductivity of the plate 60. In this embodiment, the islands 68 may best be deposited by a physical vapor deposition process, such as electron beam evaporation, magnetron sputtering and pulsed plasma processes. In one embodiment, the islands 68 are deposited to a thickness between 50 and 100 nm.

Figure 6:
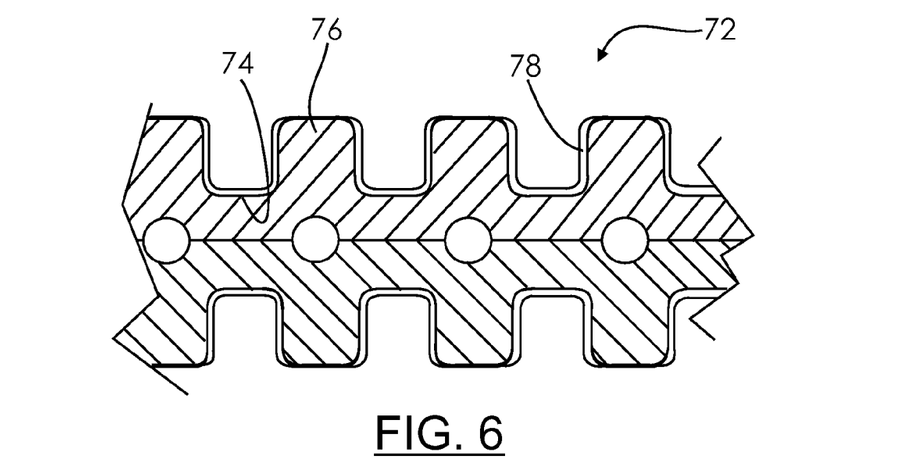
FIG. 6 is a broken-away, cross-sectional view of a bipolar plate for a fuel cell including a coating, where the coating has been removed at the lands between the flow channels in the plate, according to another embodiment of the invention.

FIG. 6 is a broken-away, cross sectional view of a bipolar plate 72 including reactant gas flow channels 74 and lands 76 therebetween, according to another embodiment of the invention. In this embodiment, a coating 78 is deposited on the bipolar plate 72. The coating 78 is then removed over the lands 76 by any suitable process, such as polishing or grinding, to expose the conductive material of the plate 72 at the lands 76. Therefore, the flow channels 74 include the hydrophilic coating, and the lands 76 are conductive so that electricity is conducted out of a fuel cell. In this embodiment, the coating 78 can be deposited thicker than the embodiments discussed above, such as 100 nm to 1 μm, because the plate 72 can be less conductive in the channels 74.

Figure 7:
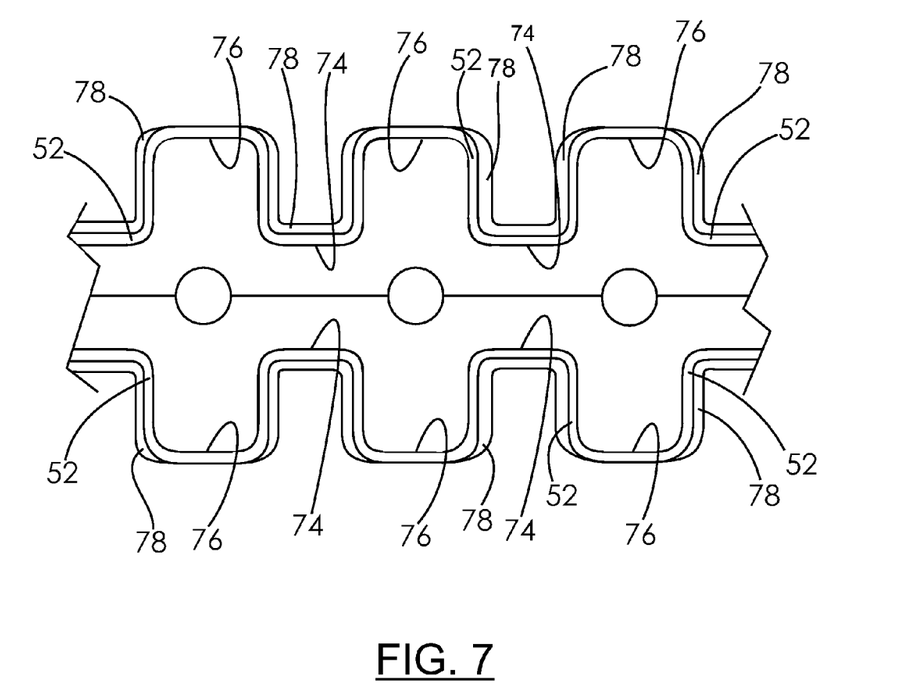
FIG. 7 is a broken-away, cross-sectional view of a bipolar plate for a fuel cell where a coating is deposited over another coating that is on the bipolar plate according to one embodiment of the invention.

FIG. 7 is broken-away, cross-sectional view of a bipolar plate 82 including reactant gas flow channels 74 and lands 76, according to another embodiment of the present invention. In this embodiment, the bipolar plate 82 has an electrically conductive protective layer 52 thereon. A coating 78 according to the present invention is provided overlying only the channels 74 of the bipolar plate 82.

Figure 8:
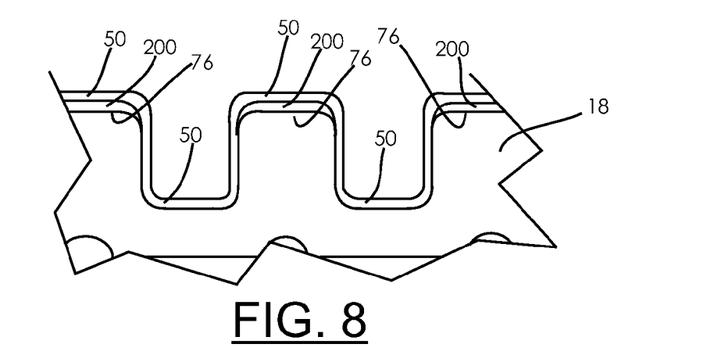
FIG. 8 illustrates one embodiment of the invention including a process including first selectively forming a mask over the lands of a bipolar plate and thereafter depositing a coating over the bipolar plate including the mask.
Figure 9:
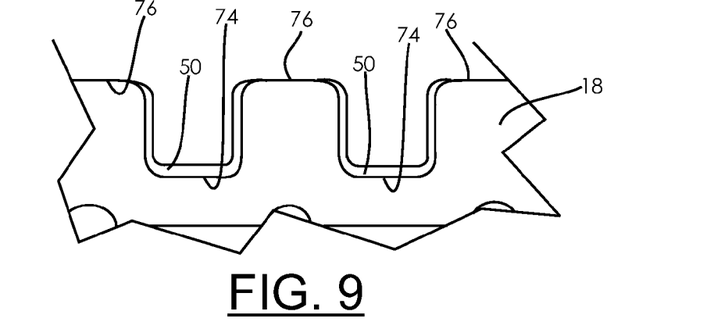
FIG. 9 illustrates one embodiment of the invention including a process wherein the mask over the lands is removed to leave the coating only overlying the channel of the bipolar plate.

FIG. 8 illustrates one embodiment of a process according to the present invention including first selectively forming a mask 200 over the lands 76 of a bipolar plate 18 and thereafter depositing a coating 50, which may include silicon, over the bipolar plate 18 including the mask 200. The mask 200 may be a hard physical mask, a viscous liquid or gel like material, or a removable material such as a photoresist. As shown in FIG. 9, the mask 200 over the lands 76 is removed to leave the coating 50 only overlying the channel 74 of the bipolar plate 18.

Figure 10:
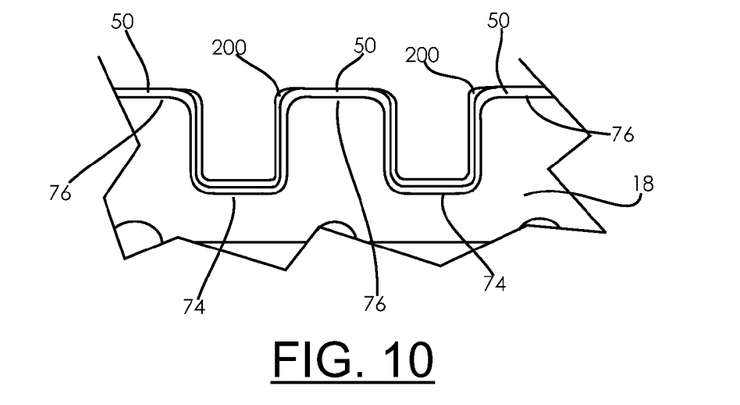
FIG. 10 illustrates one embodiment of the invention including a process including first depositing a coating including silicon over the bipolar plate, then selectively forming a mask over the channels of a bipolar plate, and thereafter the coating over the lands of the bipolar plate are etched back.

FIG. 10 illustrates one embodiment of a process according to the present invention including first depositing a coating 50 including silicon over the bipolar plate 18 including the lands 76 and channels 74, then selectively forming a mask 200, such as a photoresist or water soluble material, over the channels 74 of a bipolar plate, and thereafter the coating 50 over the lands 76 of the bipolar plate are etched back. The etch may be accomplished using a wet or dry etch process, provided the etching does not damage the bipolar plate 18. In one embodiment the coating 50 over the lands 76 may be remove by an argon plasma and thereafter any remaining portion of the mask is removed.

Figure 11:
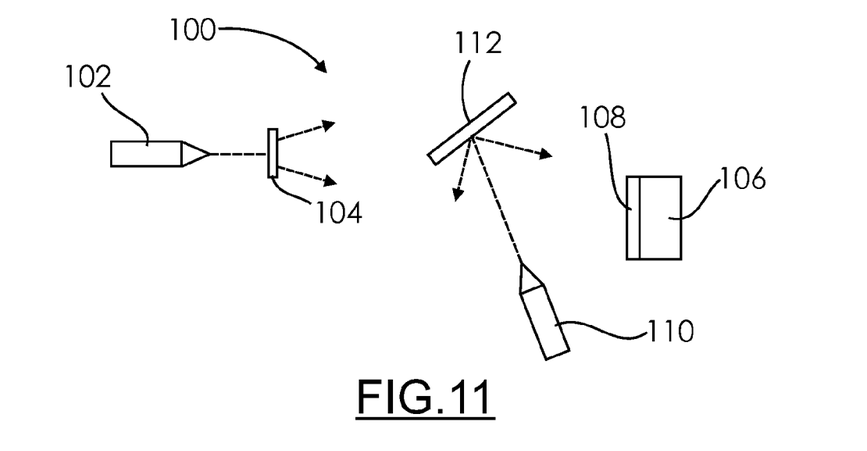
FIG. 11 is a plan view of a system for depositing the various layers on the bipolar plates according to various embodiments of the invention.

FIG. 11 is a plan view of a system 100 for depositing the various layers on the bipolar plates discussed above. The system 100 is intended to represent any of the techniques mentioned above, including, but not limited to, blasting, physical vapor deposition processes, chemical vapor deposition processes, thermal spraying processes and sol-gel. In the system 100, an electron gun 102 heats a material 104 that causes the material 104 to be vaporized and deposited on a substrate 106, representing the bipolar plate, to form a coating 108 thereon. In another process, the system 100 includes an ion gun 110 that directs a beam of ions to a sputtering surface 112 that releases material, such as a metal oxide, to deposit the coating 108. In another embodiment, the coating 50 may be applied by spraying, dipping, brushing, spinning on, or screen printing.

Figure 12:
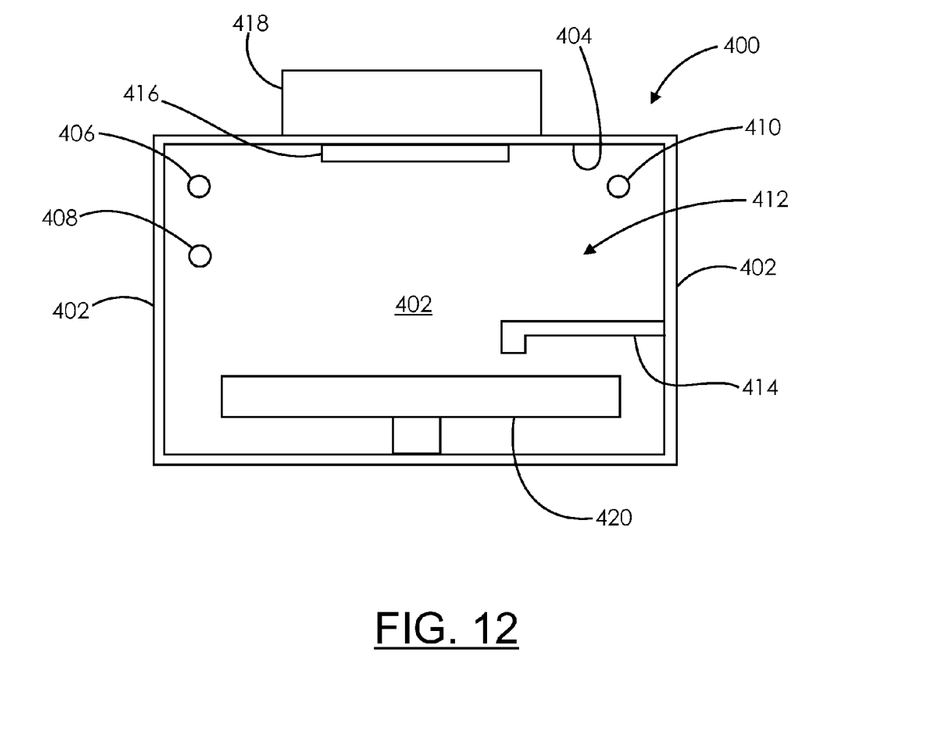
FIG. 12 illustrates one embodiment of the invention including a plasma assisted chemical vapor deposition reaction chamber useful in a process.

FIG. 12 illustrates one embodiment of a plasma assisted chemical vapor deposition reactor 400 useful in a process according to one embodiment of the present invention. The reactor 400 includes a plurality of walls 402 and a ceiling 404. A plurality of gas charging ports 406, 408, 410 may be provided through the walls 402 or ceiling 404 for charging reaction and carrier gases into the reactor chamber 412. A liquid charging dispenser 414 may also be provided. The reactor may include a microwave generating means 416 and an Rf generating means 418 to produce a plasma in the reactor chamber 412. A chuck 420 may be provided to support a fuel cell component such as a bipolar plate.

Figure 13:
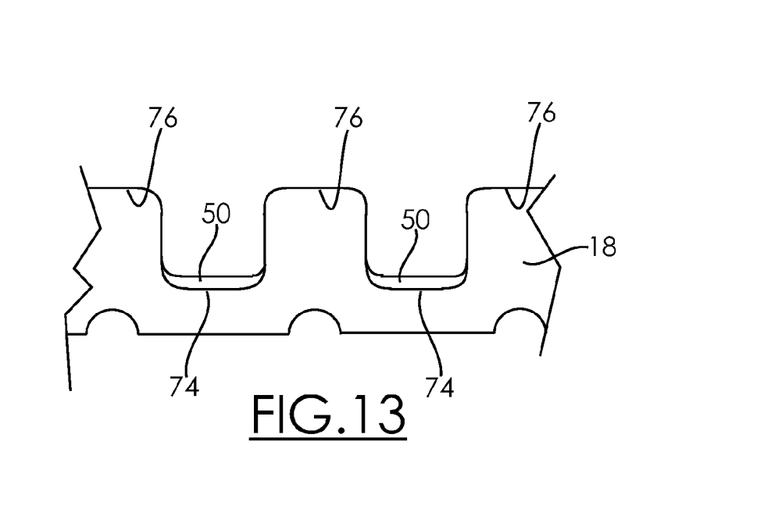
FIG. 13 illustrates embodiments of the invention including a product and a process wherein the coating flows through the channels of a bipolar plate.

FIG. 13 illustrates one embodiment of the invention including a product and a process wherein the slurry according to the present invention flows through the channels 74 of a bipolar plate 18, for example by pushing the slurry through headers (not shown) of the bipolar plate 18. Thereafter, the vehicle is driven off at a temperature ranging from 80 to 180° C. to leave a permanent coating 50 overlying a portion of the channel 74.

Figure 14A:
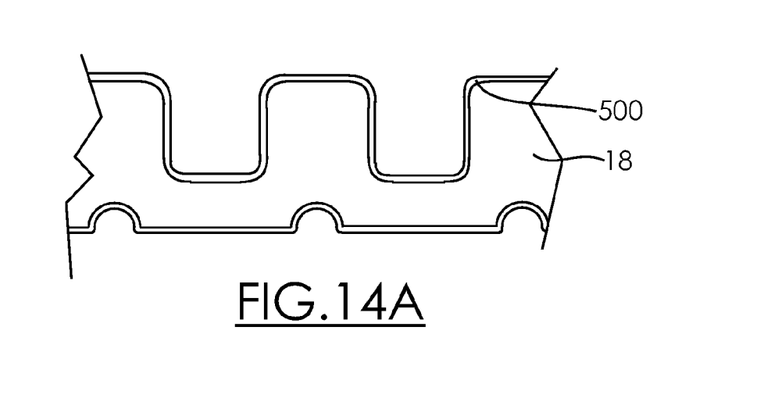
FIG. 14A illustrates a process according to one embodiment of the invention wherein a bipolar plate is molded and includes a polymer rich skin.

FIG. 14A illustrates a process according to one embodiment of the present invention wherein a bipolar plate 18 is molded and includes a polymer rich skin 500 over the outer surface, including the lands 76 and channels 74.

Figure 14B:
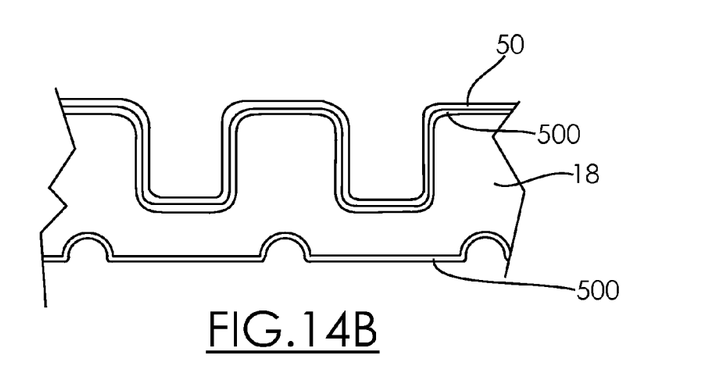
FIG. 14B illustrates process according to one embodiment of the invention including depositing a coating over the skin of FIG. 14A.

FIG. 14B illustrates a process according to one embodiment of the invention including depositing a coating over the skin 500 of FIG. 14A, wherein the coating 50 also overlies the lands 76 and channels 74 of the bipolar plate.

Figure 14C:
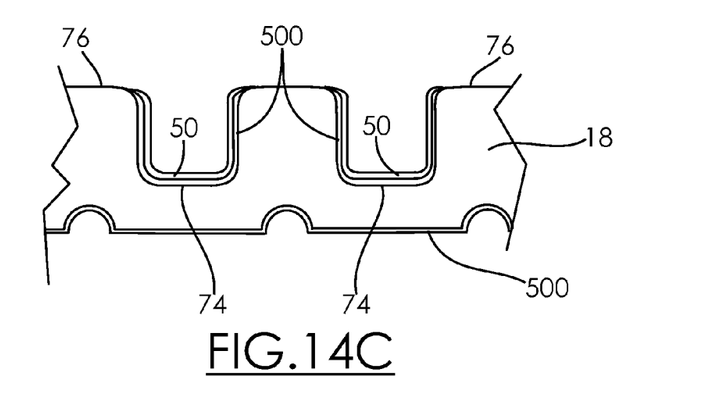
FIG. 14C illustrates a process according to one embodiment of the invention including removing the coating and skin over the lands of the bipolar plate.

FIG. 14C illustrates a process according to one embodiment of the invention including removing the coating 50 and skin 500 over the lands 76 of the bipolar plate 18.

In another embodiment of the invention a coating having Si—O and Si—R (where R is a saturated or unsaturated carbon chain) groups are selectively deposited on a flat substrate such as a foil of stainless steel and there after formed, for example by stamping, into a bipolar plate having a gas flow field including a plurality of lands and channels, and wherein the coating is deposited in the channels.

In another embodiment of the invention, a coating having Si—O and Si—R (where R is a saturated or unsaturated carbon chain) groups may be formed on a substrate using a variety of chemistries including material comprising Si and materials including carbon. For example, the coating may be produced using plasma assisted CVD with silane ($SiH_4$), oxygen and a carbon based gas or liquid. In another embodiment, the coating may be produced using plasma assisted CVD with TEOS which is tetraethyloxysilate or tetraethoxysilane ($Si(C_2H_5O)_4$), or MTEOS which is methyltriethoxysilane, and oxygen or ozone, and optionally a carbon based gas or liquid.

When the terms "over", "overlying", "overlies" or the like are used herein with respect to the relative position of layers to each other such shall mean that the layers are in direct contact with each other or that another layer or layers may be interposed between the layers.

The description of the invention is merely exemplary in nature and, thus, variations thereof are not to be regarded as a departure from the spirit and scope of the invention.

What is claimed is:

1. A process comprising depositing a slurry over at least a portion of a fuel cell bipolar plate, the slurry comprising hydrophilic nanoparticles having a sizes ranging from 2 to 100 nm and a hydrophilic side chain covalently attached to the nanoparticles, and a vehicle;

and driving off the vehicle to leave a hydrophilic coating comprising nanoparticles having sizes ranging from 2 to 100 nm.

2. A process as set forth in claim 1 wherein the nanoparticles have sizes ranging from about 2 to about 20 nm.

3. A process as set forth in claim 1 wherein the nanoparticles have sizes ranging from about 2 to about 5 nm.

4. A process as set forth in claim 1 wherein the nanoparticles comprises at least one of $SiO_2$, $HfO_2$, $ZrO_2$, $Al_2O_3$, $SnO_2$, $Ta_2O_5$, $Nb_2O_5$, $MoO_2$, $IrO_2$, $RuO_2$, metastable oxynitrides, nonstoichiometric metal oxides, oxynitrides, or derivatives thereof.

5. A process as set forth in claim 1 wherein the nanoparticles include at least one of hydroxyl, halide, carboxyl, ketonic or aldehyde functional groups.

6. A process as set forth in claim 5 wherein the nanoparticles further comprise organic side chains having functional groups.

7. A process as set forth in claim 5 wherein the hydrophilic side chains include at least one of amino, sulfonate, sulfate, sulfite, sulfonamide, sulfoxide, carboxylate, polyol, polyether, phosphate, or phosphonate groups.

8. A process as set forth in claim 5 wherein the functional groups comprise at least one of epoxy, acryloxy, methacryloxy, glycidyloxy, allyl, vinyl, carboxyl, mercapto, hydroxyl, amide or amino, isocyano, hydroxy, or silanol groups.

9. A process as set forth in claim 1 wherein the coating comprises 10 to 90% inorganic structures, and 5 to 70% hydrophilic side chains.

10. A process as set forth in claim 9 wherein the inorganic structures are silicon dioxide or nonstoichiometric silicon oxide.

11. A process as set forth in claim 9 wherein the inorganic structures comprise zirconium oxide.

12. A process as set forth in claim 1 wherein the nanoparticles have a nodule shape.

13. A process as set forth in claim 1 wherein the bipolar plate includes a gas flow field including a plurality of lands and channels, and wherein the coating is over the lands and channels.

14. A process as set forth in claim 13 further comprising removing the coating from the lands.

15. A process as set forth in claim 14 and further comprising depositing a mask over the coating that is over the channels and removing the coating over the lands, and thereafter removing any remaining portion of the mask.

16. A process as set forth in claim 13 wherein the slurry is deposited only over the channels.

17. A process as set forth in claim 13 wherein the slurry is deposited over only a portion of the channel.

18. A process as set forth in claim 13 wherein the depositing of a slurry over at least a portion of a fuel cell bipolar plate comprises flowing the slurry through the flow field.

19. A process as set forth in claim 13 further comprising depositing a mask over a portion of the bipolar plate prior to depositing the slurry, and wherein the mask leaves portions of the bipolar plate exposed.

20. A process as set forth in claim 19 wherein the slurry is deposited over the mask and exposed portions of the bipolar plate.

21. A process as set forth in claim 20 further comprising removing the mask and the coating over the mask.

22. A process as set forth in claim 19 wherein the mask comprises one of a hard mask, photoresist mask, or water washable mask.

23. A process as set forth in claim 22 wherein the mask is over the lands.

24. A process comprising depositing a slurry on at least a portion of a fuel cell bipolar plate, the slurry comprising hydrophile nanoparticles having a sizes ranging from 2 to 100 nm and a hydrophilic side chain covalently attached to the nanoparticles, and a vehicle;
and driving off the vehicle to leave a hydrophilic coating comprising nanoparticles having sizes ranging from 2 to 100 nm on the portion of the fuel cell bipolar plate.

* * * * *